(12) United States Patent
Somanath

(10) Patent No.: US 9,547,907 B2
(45) Date of Patent: Jan. 17, 2017

(54) IMAGE SEGMENTATION USING COLOR AND DEPTH INFORMATION

(71) Applicant: Intel Corporation, Santa Clara, CA (US)

(72) Inventor: Gowri Somanath, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 14/570,941

(22) Filed: Dec. 15, 2014

(65) Prior Publication Data

US 2016/0171706 A1 Jun. 16, 2016

(51) Int. Cl.
*G06T 7/00* (2006.01)

(52) U.S. Cl.
CPC .......... *G06T 7/0081* (2013.01); *G06T 7/0087* (2013.01); *G06T 2207/10028* (2013.01); *G06T 2207/20072* (2013.01); *G06T 2207/20144* (2013.01)

(58) Field of Classification Search
None
See application file for complete search history.

(56) References Cited

U.S. PATENT DOCUMENTS

| | | | |
|---|---|---|---|
| 6,483,940 B1 * | 11/2002 | Wang | G06K 9/38 358/515 |
| 8,121,407 B1 | 2/2012 | K et al. | |
| 9,072,929 B1 * | 7/2015 | Rush | A63B 24/0062 |
| 2006/0239558 A1 | 10/2006 | Rafii et al. | |
| 2008/0152191 A1 * | 6/2008 | Fujimura | G06K 9/00214 382/103 |
| 2010/0266175 A1 * | 10/2010 | Seung | G06T 7/0081 382/128 |
| 2011/0164152 A1 * | 7/2011 | Hong | G03B 13/18 348/239 |
| 2011/0229024 A1 | 9/2011 | El-Maraghi et al. | |

(Continued)

FOREIGN PATENT DOCUMENTS

CN 102246204 11/2011

OTHER PUBLICATIONS

U.S. Appl. No. 14/193,934, filed Feb. 28, 2014 and entitled: "Mechanism for Facilitating Fast and Efficient Calculations for Hybrid Camera Arrays"; Inventer: Somanath.

(Continued)

*Primary Examiner* — Stephen R Koziol
*Assistant Examiner* — Delomia L Gilliard
(74) *Attorney, Agent, or Firm* — Green, Howard & Mughal, LLP

(57) ABSTRACT

Image segmentation utilizing 3D image data. A plurality of pixels of an image frame may be segmented based at least on a function of pixel color and a pixel depth over the spatial positions within the image frame. A graph-cut technique may be utilized to optimize a data cost and smoothness cost in which at least the data cost function includes a component that is a dependent on a depth associated with a given pixel in the frame. In further embodiments, both the data cost and smoothness functions are dependent on a color and a depth associated with each pixel. Components of at least the data cost function may be weighted for each pixel to arrive at most likely segments. Segmentation may be further predicated on a pre-segmentation label assigned based at least on a 3D spatial position clusters.

23 Claims, 12 Drawing Sheets

(56) References Cited

U.S. PATENT DOCUMENTS

| | | | | |
|---|---|---|---|---|
| 2012/0321190 | A1* | 12/2012 | Sullender | G06K 9/342 382/180 |
| 2013/0230237 | A1* | 9/2013 | Schlosser | G06T 7/0081 382/164 |
| 2013/0342559 | A1* | 12/2013 | Reso | G09G 5/02 345/591 |
| 2014/0072212 | A1* | 3/2014 | Sorgi | G06T 7/0081 382/164 |
| 2014/0184792 | A1* | 7/2014 | Ogasawara | H04N 5/2621 348/140 |
| 2016/0035124 | A1* | 2/2016 | Sinha | G06T 7/0081 345/424 |

OTHER PUBLICATIONS

Li et al., "Segmentation Using Superpixels: A Bipartite Graph Partitioning Approach", Dept. of Electr. Eng., Columbia Univ., New York, NY, USA, 2012 IEEE Conference on Computer Vision and Pattern Recognition (CVPR), Jun. 16-21, 2012 (8 pages).

Veksler et al. "Superpixels and Supervoxels in an Energy Optimization Framework", ECCV'10 Proceedings of the 11th European conference on Computer vision: Part V, Springer-Verlag Berlin, Heidelberg © 2010, pp. 211-224 (14 pages).

Kolmogorov et al., "What Energy Functions Can Be Minimized via Graph Cuts?", IEEE Transactions on Pattern Analysis and Machine Intelligence, vol. 26, No. 2, Feb. 2004, pp. 147-159 (13 pages).

Boykov et al., "An Experimental Comparison of Min-Cut/Max-Flow Algorithms for Energy Minimization in Vision" In IEEE Transactions on PAMI, vol. 26, No. 9, pp. 1124-1137, Sep. 2004, pp. 1-34 (34 pages).

Ishikawa, "A Practical Introduction to Graph Cut", Tutorial 1, PSIVT2009 Department of Information and Biological Sciences, Nagoya City University the 3rd Pacific-Rim Symposium on Image and Video Technology (PSIVT2009). National Institute of Informatics, Tokyo, Japan, Jan. 13-16, 2009 (32 pages).

Rastogi et al., "Localized Hierarchical Graph Cuts" Sixth Indian conference on Computer Vision, Graphics & Image Processing, 2008. ICVGIP '08, Bhubaneswar, IN Dec. 16-19, 2008 (8 pages).

International Search Report and Written Opinion for International Application No. PCT/CN2015/078959 mailed Feb. 14, 2016, 8 pages.

Yan, Ke—Research and Implement on Digital Image 3D Stereoscope Display Algorithm Master's Thesis Mar. 31, 2012(Mar. 31, 2012) 13 pages.

* cited by examiner

IMAGE SEGMENTATION USING COLOR AND DEPTH INFORMATION

BACKGROUND

A digital camera is a component often included in commercial electronic media device platforms. Digital cameras are now available in wearable form factors (e.g., video capture earpieces, video capture headsets, video capture eyeglasses, etc.), as well as embedded within smartphones, tablet computers, and notebook computers, etc. Three-dimensional (3D) cameras are becoming more common, and can now be found on many mobile devices/platforms. These devices provide enhanced entertainment and utility experiences to an end user. For example, photography may be enhanced by depth information output from the 3D camera.

Often, a digital camera user wishes to segment an image frame into visually distinct objects. The definition of an "object" can vary from a single instance to a whole class of objects. Once selected, special effects may be applied to one or more objects, objects from multiple photos may be mixed into one, objects may be removed from photos, etc. Such object-based image processing may be on-line, or real-time with image capture, or may be performed during post-processing.

Segmentation algorithms typically allow a user to select parts of an image or specific object of interest. In conventional tools, this is accomplished through color or texture based image segmentation. FIG. 1 is a schematic showing conventional foreground-background image data segmentation based on color or texture information. A 2D image frame 120 captured by digital camera 110 includes a representation of real world object 101 (e.g., subject person) in the foreground, a real world object 102 (e.g. tree), and a real world object 103 (e.g., sky). A foreground-background segmentation method 101 is performed, for example when a user selects a displayed region of image frame 120 corresponding to object 101. Foreground-background segmentation process 101 outputs a visual indication of a foreground segment 111 and a background segment 113. However, because real world objects are composed of multiple colors and textures, a foreground-background segmentation method may define a segment border 195 that erroneously includes some portion of object 103 in addition to object 101. This may happen because color or texture information alone is insufficient to segment a single object having multiple colors, textures, etc. that should be combined. Also, a real world scene is composed of multiple objects and not just a single foreground and background. Multiple user interaction steps may then be required to arrive at an acceptable segment, for example achieving the segment border 196.

Thus, there is a need for a multi-layer segmentation algorithm that can separate a scene into multiple objects, each with a unique label or segment ID based on color and depth information obtained using any 3D camera or 3D scanner. However, depth information included in image data is often noisy, sparse, and lower resolution compared to the color image. Also, two objects may be at indistinguishable depths. For example a person standing on a road, objects placed on a table, etc. Thus, depth alone may also be insufficient to suitably segment a scene for end user applications.

Hence, there is a need for a multi-layer segmentation algorithm that employs both the color and depth information jointly. Automated image segmentation techniques and system(s) to perform such techniques that are capable of fully integrating the richer data set generated by a 3D camera are therefore advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
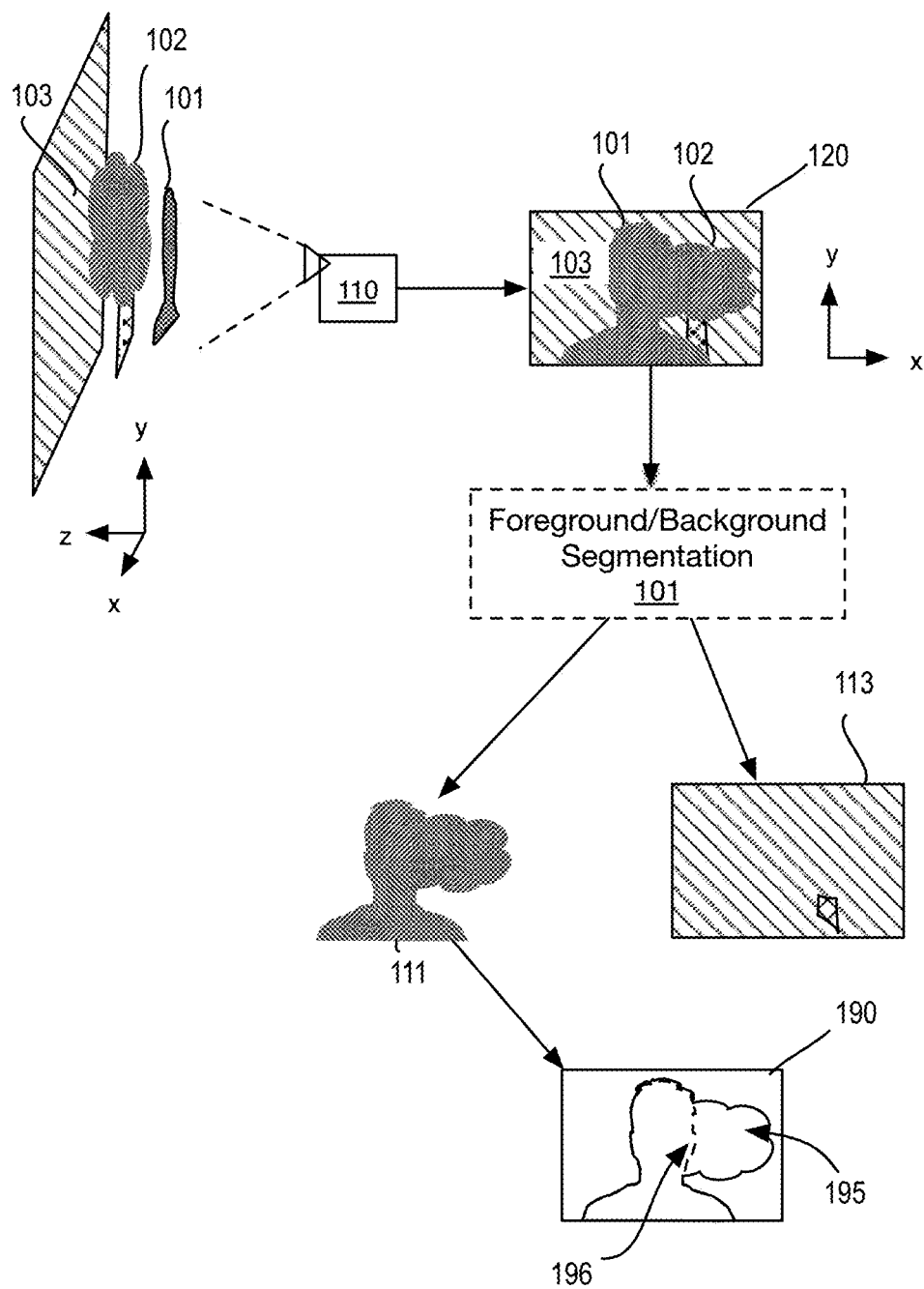
FIG. 1 is a schematic depicting conventional foreground-background image data segmentation based on color or texture information.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in an image processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for multilayer image segmentation utilizing 3D image data. A plurality of pixels of an image frame may be segmented based at least on a function of pixel color and a pixel depth over the spatial positions within the image frame. The functions employed in some embodiments herein are grounded in the logic that pixels of a same depth, and/or connected in 3D space, are more likely to belong to the same object, even if they have different color/texture.

In some embodiments, a graph-cut technique is utilized to optimize a data cost and smoothness cost in which at least the data cost function includes a component that is a dependent on a depth associated with a given pixel in the frame. In some such embodiments, a joint RGB-D automated segmentation algorithm employs a Markov Random Field (MRF) formulation. In further embodiments, both the data cost and smoothness functions are dependent on a color (e.g., RGB) and a depth (D) associated with each pixel. In some embodiments, adaptive weights are utilized in the MRF formulation, which scale with the confidence in the depth information. In some embodiments, the adaptive weights may limit impact of noisy and/or sparse depth data. In some embodiments, segmentation may be further predicated on a pre-segmentation label assigned based at least on 3D position clusters.

Figure 2:
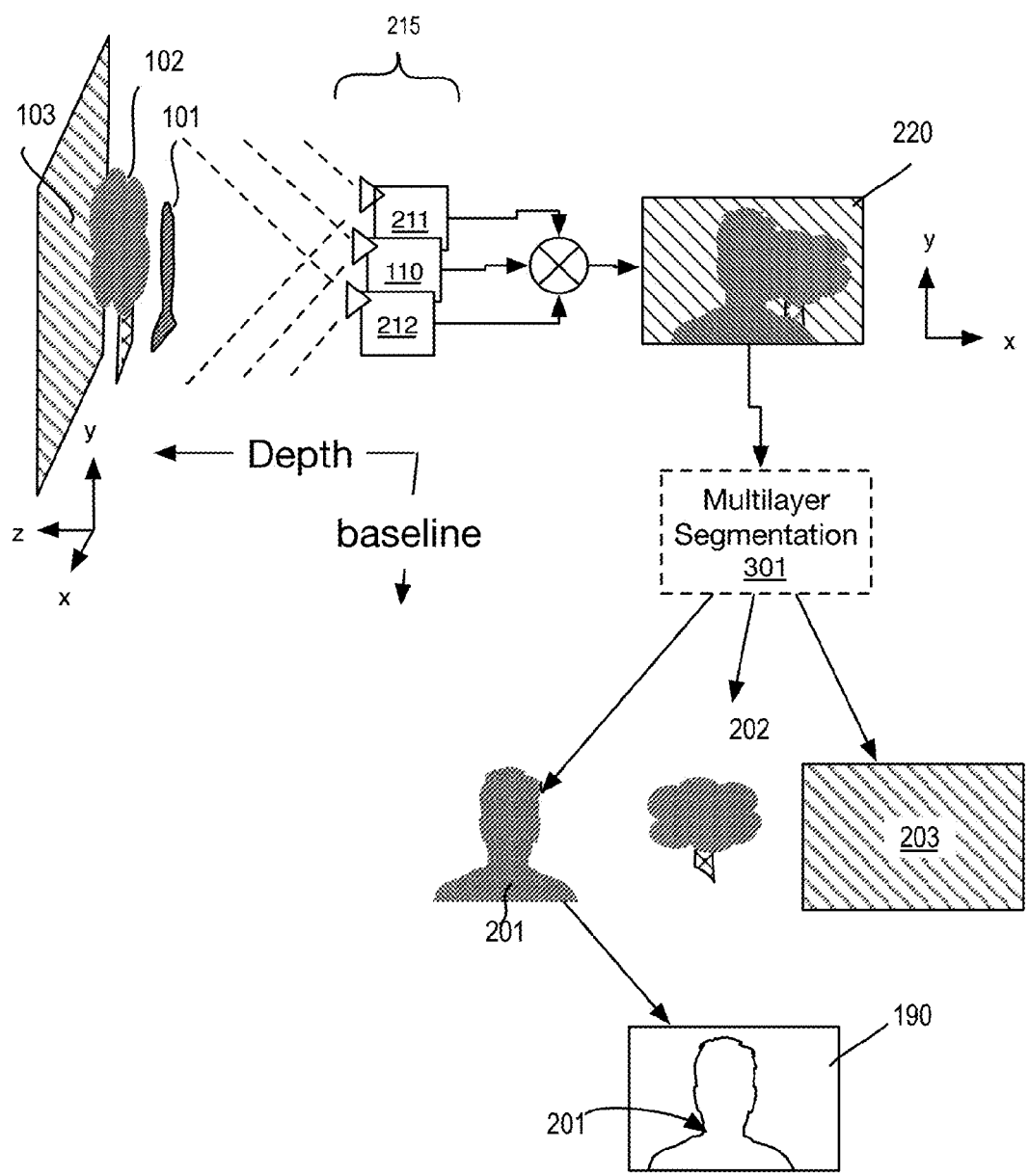
FIG. 2 is a schematic depicting multilayer image data segmentation based on color and depth information, in accordance with some embodiments.

The techniques described below in detail for exemplary embodiments can be used many different platforms and/or 3D image data, such as, but not limited to, multi-camera (array camera) systems, and active light depth sensors. FIG. 2 is a schematic depicting multilayer image data segmentation based on color and depth information collected by an array camera 215, in accordance with exemplary embodiments. For purposes herein, "multi-layer" segmentation separates a scene into multiple objects with each object receiving a unique label or segment ID rather than merely a foreground/background designation.

In some embodiments, array camera 215 is a component of a mobile computing device having a plurality of camera modules 110, 211, and 212 with a predetermined baseline relationship, Although in the exemplary embodiments three camera modules are illustrated, any number of camera modules and/or image sensors may be included in an array camera as embodiments herein are not limited in this respect. Each of the plurality of camera modules 110, 211, 212 output an image captured from a different camera viewpoint. In exemplary embodiments, the image(s) captured from each viewpoint is captured at substantially the same instant of time such that they contain image data for a given scene. For example, at least a portion of scene including foreground object 101 (subject) and background 103 is captured in three image frames, one of which may be designated as a reference and combined into an image frame 220 having depth information. For example, where camera module 110 has a higher resolution (e.g., 8 megapixel, or more) than camera modules 211, 212 (e.g., 720 p, HD, etc.), camera module 110 may provide a default reference image. Camera modules 211 and 212 may be considered supplemental to the reference and are each associated with predetermined baseline vector (length and direction) from camera module 110. In an exemplary embodiment where camera modules 110, 211, and 212 are on a mobile platform, the baseline vector between the reference camera module and each supplemental camera module may have a length of tens of millimeters to tens of centimeters, depending on the form factor. In other embodiments, where camera modules 110, 211, 212 are separate infrastructure fixtures, baseline lengths may be on the order of meters. In one exemplary mobile device embodiment, camera modules 110, 211, and 212 are along one baseline with camera modules 211 and 212 spaced by known distances on opposite sides of reference camera module 110.

In accordance with some embodiments, multilayer segmentation method 301 is performed to determine multiple unique labels for the different objects, at least in part, on color and depth information. For example, real world object 101 is labeled image segment 201, real world object 102 is labeled image segment 202, and real world background 103 (e.g., sky) is labeled image segment 203. Compared to segment 111 (FIG. 1), segment 201 is more accurately distinguished from surrounding segments 202, 203. In addition, the segment 202 is separated from the segment 203 unlike conventional foreground-background segmentation. An automated association made between segment 201 and output image frame 190 may then be in better agreement with human perception.

Figure 3A:
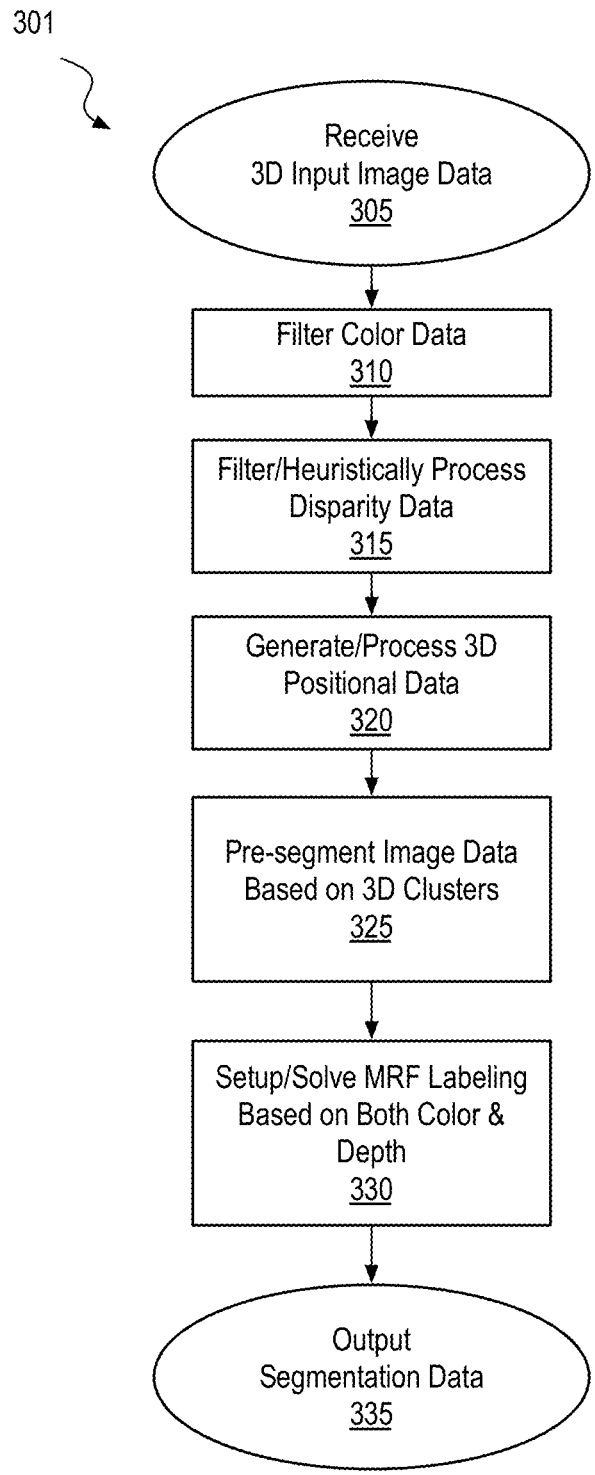
FIG. 3A is a flow diagram of a multilayer image data segmentation method employing color and depth information, in accordance with some embodiments.

FIG. 3A is a flow diagram of multilayer image data segmentation method 301, in accordance with some embodiments. Method 301 begins with receiving 3D input image data. Method 301 is generally applicable to any form of image data that includes depth information and color information for a plurality of pixels associated with a particular image frame defined by the 2D spatial correlation of the pixels. In advantageous embodiments, there is a depth value associated with each pixel of an image frame.

Figure 4A:
FIG. 4A illustrates an input image frame, in accordance with some embodiments.

In one exemplary embodiment, image data received at operation 305 includes pixel values (e.g., intensity) for each of a plurality of color channels. The color channels may be in any color space. In some embodiments, the input image data received at operation 305 includes color information in the RGB color space, denoted herein as image data $I_{rgb}$. FIG. 4A illustrates a frame 401 of input image data $I_{rgb}$, in accordance with some embodiments. Image data $I_{rgb}$ may also be in other color spaces, perhaps having been preprocessed upstream of method 301, for example converted to color information to the YUV/HSL/HSV space from another color space such as the RGB color space, the $YP_BP_R$ (luma, blue difference chroma $Y_B$, and red difference chroma $P_R$) color space, the $YC_BC_R$, (luma Y, blue difference chroma $C_B$, and red difference chroma $C_R$) color space, or the like.

Figure 4B:
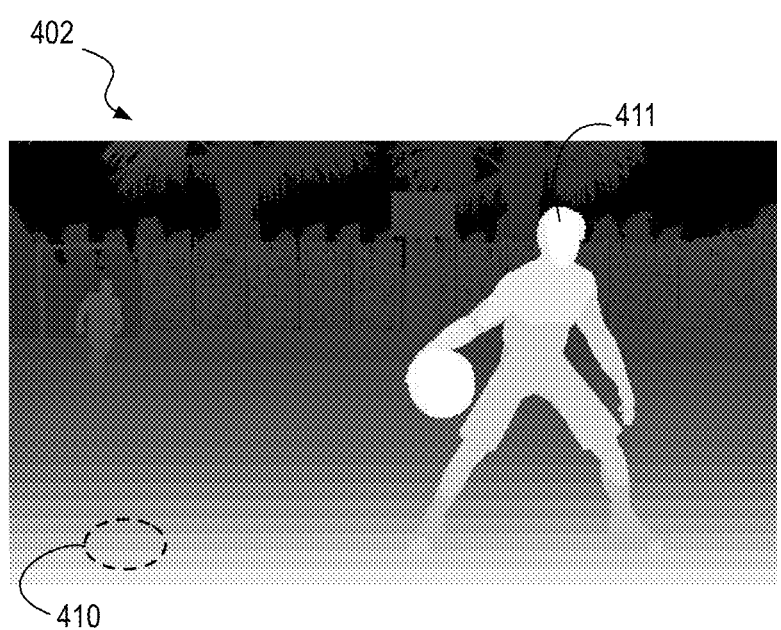
FIG. 4B illustrates a disparity map associated with the input image frame depicted in FIG. 4A, in accordance with some embodiments.

In some embodiments, depth information received at operation 305 is in the form of a depth map correlated with a plurality of pixels, each having an image coordinate x,y associated with image $I_{rgb}$. In other embodiments, the depth information received at operation 305 is in the form of a disparity map correlated with a plurality of pixels, each having an image coordinate x,y associated with image $I_{rgb}$. FIG. 4B illustrates a disparity map 402 associated with the input image frame 401 depicted in FIG. 4A, in accordance with some embodiments. As shown in FIG. 4B, real world objects 410 (e.g., nearby region of ground) 411 (e.g., basketball player) have considerable contrast from other features in the scene.

For some disparity embodiments, image data received at operation 305 may further include camera parameters, such as camera focal length $C_f$ and camera baseline $C_b$, from which disparity values corresponding to pixels in a reference $I_{rgb}$ image may be estimated at operation 305 from a plurality of images $I_{rgb}$ generated by an array camera (e.g., array camera 215 in FIG. 2). For such embodiments, a disparity value associated with a pixel indicates the correspondence of the pixel in one image (e.g., collected by camera module 110) to a pixel in another image (e.g., collected by camera module 211). The disparity estimation may be made by any means, as embodiments herein are not limited in this respect. In some embodiments, the image data has been preprocessed upstream of method 301, for example to rectify multiple images to a reference prior to a disparity map calculation.

In some embodiments, the color information $I_{rgb}$ and depth information at input operation 305 are of equal height and width albeit potentially of different resolution. For example, the depth/disparity data may be sparse, with a predetermined value (DISP_UNKNOWN) applied to any pixel of $I_{rgb}$ where disparity is not known because of a lower resolution sensor output, occlusion, etc.

Figure 4C:
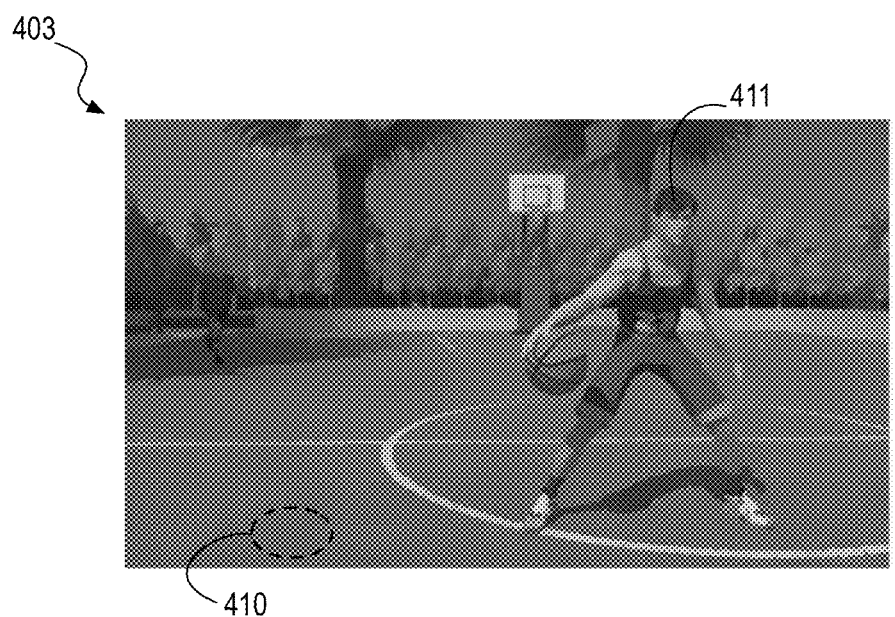
FIG. 4C illustrates a filtered input image, in accordance with some embodiments.

Referring still to FIG. 3A, method 301 continues at operation 310 with filtering the input image $I_{rgb}$ to generate a filtered image $I_f$. Any known filtering technique to quantize the color channels and/or reduce input image noise may be performed at operation 310 as embodiments herein are not limited in this respect. Filtering operation 310 may improve performance of subsequent segmentation operations, for example reducing the likelihood that objects are over-segmented. In some exemplary embodiments, the input image $I_{rgb}$ is processed through a Gaussian blur filter at operation 310. In some such embodiments, processing of the input image $I_{rgb}$ at operation 310 further entails a pyramid-based mean shift filter. FIG. 4C illustrates a filtered image 403, in accordance with some embodiments where a Gaussian blur filter and a pyramid-based mean shift filter is applied to input image 401 (FIG. 4A). A smoothening in region 410 denoted in FIG. 4C from that in 4A is attributable to an exemplary embodiment of color filtering operation 310.

In some embodiments, segmentation of an input image is based at least in part on one or more heuristic that enables object segmentation to better match human perception. Returning to FIG. 3A, one such heuristic may be introduced at operation 315 by excluding a portion of the disparity values received at operation 305 based on predetermined criteria. Input disparity map D may be filtered to remove noise and/or disparity values having low confidence. Any number of statistical techniques and/or filters may be applied to the population of disparity values associated with the plurality of pixels in the image frame to arrive at a subset of disparity values that are to be included in subsequent segmentation operations. Operation 315 therefore is a first control point for modulating the strength of the depth component of the segmentation process. In some embodiments, a disparity mean $m_D$, and disparity standard deviation $s_D$ is computed for the input disparity map D. A disparity value failing to satisfy a predetermined threshold (e.g., maximum/minimum $m_D$ or $s_D$) may then be set to a predetermined value (e.g., DISP_UNKNOWN) to affect exclusion from the subsequent segmentation process. In some embodiments, all disparity values that are above $\tau_1 m_D + \tau_2 s_D$ are removed at operation 315. Although operation 315 is described in the context of depth information received as disparity data, similar heuristic processing may be applied to filter a depth map. For example, depth maps may be thresholded beyond a certain range based on the use case. All values in the Z, and the corresponding pixels in X, Y image positions that fall outside the desired depth range may be set to a predetermined value for exclusion.

For some embodiments (e.g., where a 3D coordinate map is not received as an input at operation 305), method 301 continues to operation where a "world 3D coordinate" map of the image data is generated at operation 320. For some disparity-based embodiments, the world 3D coordinate map is computed at operation 320 as:

$$Z(x, y) = \frac{(C_f * C_b)}{D(x, y)}, \quad (1)$$

$$X(x, y) = \left(x - \frac{W}{2}\right) * \frac{z(x, y)}{C_f}, \text{ and} \quad (2)$$

$$Y(x, y) = \left(y - \frac{H}{2}\right) * \frac{z(x, y)}{C_f}. \quad (3)$$

where $C_f$ is again the camera focal length, $C_b$ is the camera baseline, W, H are the width and height of the images, respectively, x,y are the image coordinates of a pixel within the image frame, and D(x,y) is the disparity value at pixel position x,y. Notably, the world coordinates are zeroed out where the disparity value at a given pixel position has been excluded (e.g., set to 0 and/or DISP_UNKNOWN in operation 315). In some embodiments, Z (depth) values determined from Eq. (1) may be thresholded beyond a certain range based on the use case. For example, Z values (and corresponding pixels in X, Y maps) that fall outside the desired depth range may be set to a predetermined value for exclusion.

In some exemplary embodiments, the X, Y, Z coordinate values generated at operation 320 (or received in suitable form at operation 305) are combined into a new representation useful for identifying 3D spatial position data clusters. The 3D spatial position representation generated at operation 320 may further implement another heuristic that enables object segmentation to better match human perception. In some embodiments, the world X, Y, Z coordinate values are combined into a 3D spatial position image $I_{xyz}$:

$$I_{XYZ} = \frac{X + Y + Z}{3}. \quad (4)$$

Figure 4D:
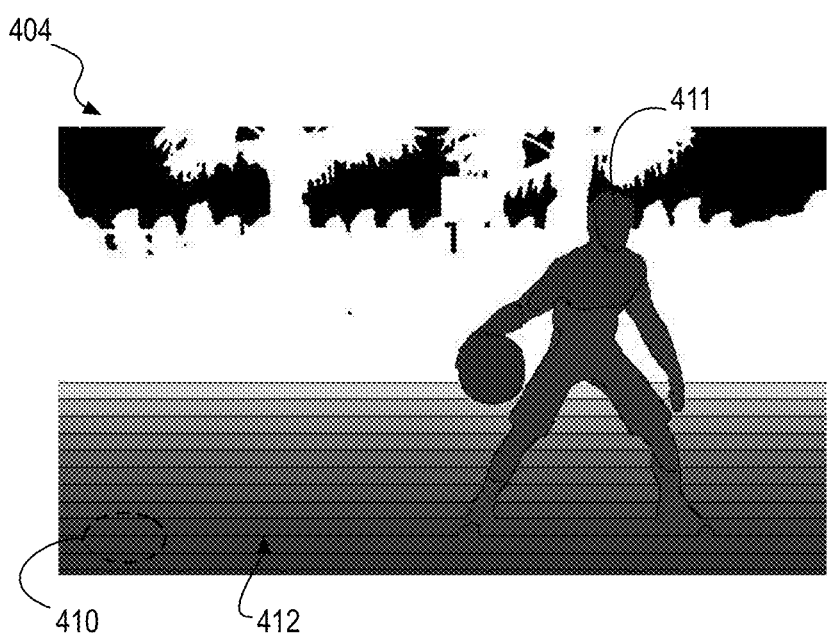
FIG. 4D illustrates a 3D spatial position map of the filtered input image depicted in FIG. 4C, in accordance with some embodiments.

FIG. 4D illustrates a 3D spatial position image 404 generated for the filtered input image $I_f$ 403 (FIG. 4C), in accordance with some embodiments. In FIG. 4D the values $I_{XYZ}$ are mapped to pixel positions (x,y) of the input image frame with $I_{XYZ}$ represented in gray scale. The X, Y, Z values in 3D spatial position image 404 that are zeroed out as a result of disparity filters are shown in black (e.g., lines 412).

Returning to FIG. 3A, pre-segmentation of the input image data is performed at operation 325. Pre-segmentation generates an initial image segmentation (labeling) $I_{preS}$ of the input scene based on a plurality of depth bins $bins_{preS}$ determined from clusters in the 3D spatial positional image $I_{xyz}$. The initial binning of the pixels determined at operation 325 may then be employed in a subsequent segmentation stage of method 301.

Figure 3B:
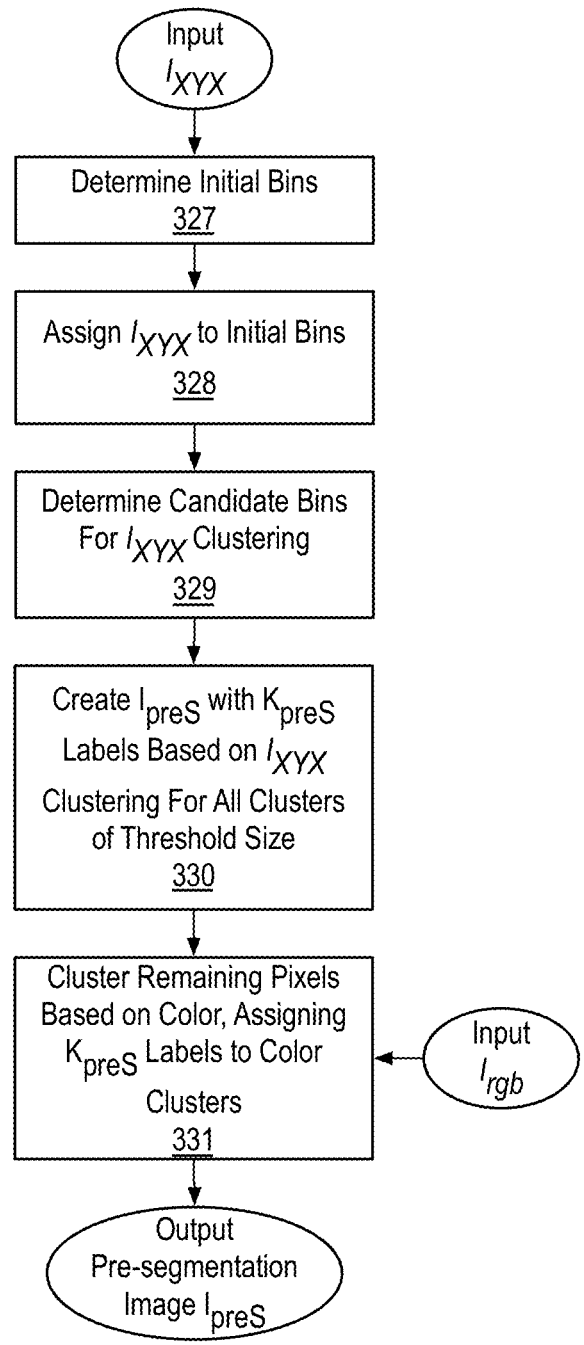
FIG. 3B is a flow diagram of a pre-segmentation method that is performed as part of the segmentation method depicted in FIG. 3A, in accordance with some embodiments.

FIG. 3B is a flow diagram of a pre-segmentation method 326 that is performed during operation 325, in accordance with some embodiments. Method 326 begins with an input of the 3D spatial positional image $I_{XYZ}$. A probability of an occurrence within each of a plurality of 3D spatial position bins is determined. In other words, a mass probability distribution function of $I_{XYZ}$ is binned out. At operation 327, a number of initial bins is determined. In some embodiments, the number of initial bins is computed as:

$$nbins = \max\left(3, \frac{MAX_{XYZ} - MIN_{XYZ}}{\delta_{XYZ}}\right), \quad (5)$$

where $MAX_{XYZ}$, $MIN_{XYZ}$ denote the maximum and minimum of the known values in $I_{XYZ}$, respectively, and $\delta_{XYZ}$ is a scalar tuning parameter. In some embodiments the scalar tuning parameter is configurable through an application layer of the software stack instantiating a pre-segmentation module having logic to perform method 326. At operation 328, known values in $I_{XYZ}$ are allocated to corresponding ones of the $n_{bins}$ between the max and minimum values.

At operation 329, a set of "candidate," or "potential" 3D spatial position clustering bins are then determined by splitting or merging the initial 3D spatial position bins based on a depth-sensitive threshold. The potential bins are to be utilized for clustering the objects in the scene at operation 330. Pseudo code for determining the potential bins potbins of bin width potbinsw according to some embodiments is provided below where $cbin_i$, $hbin_i$, denote the center and number of pixels in the $i^{th}$ bin, and binw is the width of each bin:

```
cnt=0 /* initialize counter */
For i=1 to nbins
    if hbin_i > τ_h then do, else next bin_i
{
        compute depth-sensitive threshold  τ_d = cbin_i / τ_m
            /* allow objects close to camera to be segmented more
            * than those farther away, as controlled by scalar value τ_m
            */
        if [i == 1]or
          [|(potbins(i − 1) − cbin_i)| > τ_d] or
          [potbins (i − 1) * binw > τ_m] then
              {cnt = cnt + 1, potbin(cnt) = cbin_i, potbinsw(cnt) = 1.}
              /*make new cluster if first bin, current bin is far enough
              *from previous bin, or cluster growing past threshold size
              */
        else
              {potbin(cnt) = cbin_i,potbinsw(cnt) = potbinsw(cnt) + 1}
              /*combine clusters */
}end if hbin_i>τ_h
```

In the above computation of the candidate bins, the scalar value $\tau_m$ may vary based on use/application. In some embodiments, $\tau_m$ is a configurable tuning parameter that may be defined at the application layer of a software stack. The value of $\tau_m$ may for example depend on the depth range of a 3D camera, which may vary from a few centimeters to many meters.

Method 326 continues with operation 330, where the pre-segmentation image $I_{preS}$ is generated with labels based on the potential (candidate) bins. 3D spatial position clusters that satisfy a predetermined minimum cluster size $\tau_c$ are separated into first connected components. A pre-segmentation label, such as an integer value ID, is then assigned to one or more pixel in each first connected component that satisfies a predetermined minimum connected component size $\tau_{cc}$. Pseudo code for the pre-segmentation labeling in accordance with some exemplary embodiments is provided below:

```
K_preS = 0 /* initialize number of pre-segmentation labels */
For i= 1:cnt
    lower = potbins(i)
    upper = potbins(i+1)
    if I_XYZ(x,y) ≥ lower and I_XYZ(x,y) ≤ upper then
        I_mask(x,y)=1
        /* create mask marking all pixels in the XYZ image that have a
        * value spanned by a candidate bin
        */
        if number of pixels in I_mask > τ_C then
            separate connected components in I_mask
            generate image I_cc labeling each connected component with ID
            for each connected component in I_cc
                if number of pixels in component > τ_CC then
                    K_preS = K_preS+1
                    bins_preS(K_preS)=0.5(upper+lower)
                    I_preS(x,y)=K_preS, ∀(x,y) /* in current component
                end
            end
        end
end.
```

Figure 4E:
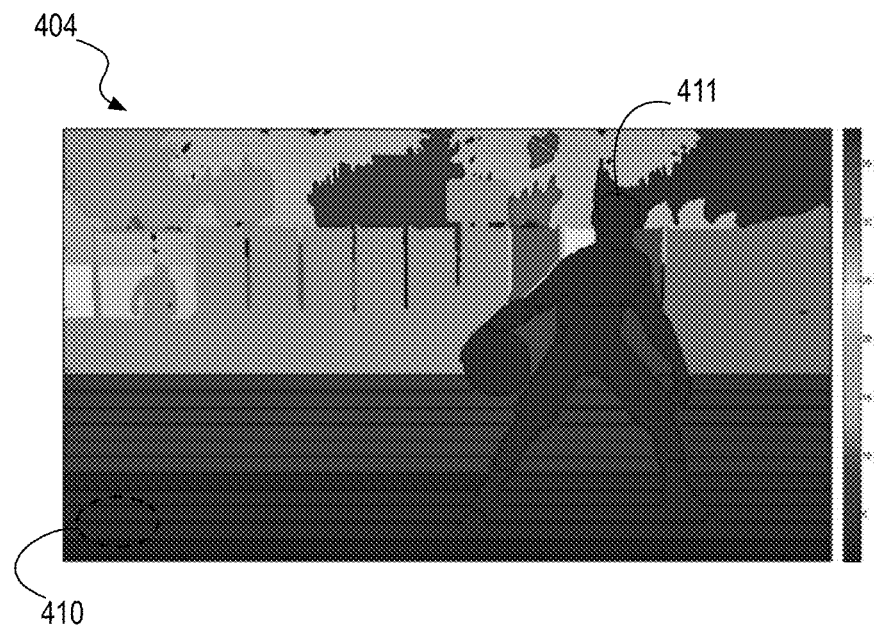
FIG. 4E illustrates pre-segmentation labeling generated from based on the images in FIG. 4C and FIG. 4D, in accordance with some embodiments.

In some embodiments, color clustering is utilized to resolve any pixels that do not receive a pre-segmentation label at operation 330 based on 3D spatial position clusters. At operation 331, color clustering resolves those pixels that failed to satisfy the minimum 3D spatial position cluster size $\tau_c$. In some embodiments, a mask $I_{mc}$ of pixels that do not have a pre-segmentation label is generated (e.g., if $I_{preS}(x,y)=0$, then $I_{mc}(x,y)=1$). An indexed image $I_{cf}$ is then generated by clustering the color (R,G,B) from the filtered image $I_f$ for those masked pixels into a number of color bins $\text{nbins}_c$. Any color clustering technique may be utilized as embodiments are not limited in this respect. The color clusters are then separated from $I_{cf}$ into connected components, and a new label (integer ID $K_{preS}$) is assigned to each pixel within each connected component in $I_{cf}$, for example:

$K_{preS}=K_{preS}+1$ $\text{bins}_{preS}(K_{preS})=\text{DISP\_UNKNOWN}$ $I_{preS}(x,y)=K_{preS}, \forall(x,y)/*$ in current component Method 326 is then complete with the pre-segmentation image $I_{preS}$ being an output returned to method 301. FIG. 4E illustrates in gray scale a pre-segmentation image 405 generated from the $I_{XYZ}$ image 404 (FIG. 4D), and further based on the filtered input image 403 (FIG. 4C), in accordance with some embodiments. The output of operation method 326 may include pixels with unknown segmentation ID, and the scene may be under-segmented or over-segmented. For instance, in FIG. 4E ground region 41 has multiple labels even though human perception would be that these labels belong to the same object.

Returning to FIG. 3A, method 301 continues with segmentation operation 330. In embodiments, image data is segmented at operation 330 based at least on pixel depth, pixel color, and pixel position within the image frame. In exemplary embodiments, the segmentation operation 330 is further based on pre-segmentation image $I_{preS}$ output from operation 325 with operation 330 refining the pre-segmentation and optimizing the problem setup to obtain a final labeling.

In some embodiments, segmentation at operation 330 is modeled as a labeling problem, where the image pixels are modeled as Markov Random Field (MRF), which may be solved using alpha-expansion (also known as 'graph-cut'). The objective is then to minimize the following energy formulation using graph-cut/alpha-expansion:

$$M(f)=\Sigma_{p\in P}D(f_p)+\Sigma_{(p,q)\in N}V(p,q,f_p,f_q), \quad (6)$$

where the first term in the summation is the 'Data cost' and the second is the 'Smoothness cost'. N is a neighborhood of a pixel p that includes a pixel q as further defined below. With P being the set of pixels in the (filtered) input image, and L being the set of labels corresponding to the labels in bins$_{preS}$ (i.e., L={L$_1$, L$_2$, ..., L$_{K_{preS}}$}), the function $f$ is a labeling/mapping function that assigns a label $f_p \in L$ to each pixel p∈P.

The data cost intuitively measures the cost of assigning a given label to a given pixel. In other words, the data cost term determines the cost of assigning a label $f_p$ to pixel p. In embodiments, the data cost of assigning a label $f$ to p is a function of pixel depth, pixel color, pixel position, and pre-segmentation. In some embodiments, the data cost is premised on the logic that pixels of a same depth are more likely to belong to the same object than are those at different depths. Similarly, pixels of the same color are more likely to belong to the same object than are those of different color. Pixels closer together in the image plane (XY) are more likely to belong to the same object than are those farther apart, and pixels having a same pre-segmentation label are more likely to belong to a same object than are those having different pre-segmentation labels.

$$D(p,f) = w_d(p)\Phi(I_{XYZ}(p) - bins_{preS}(f)) + w_c(p)\Sigma_{i=1:3,b=1:hbins}\Phi(I_{fi}(p) - H_{fi}(b)) + w_p(p)\Phi(p - \Delta_f(p)) + w_s(p)\Phi(f - I_{preS}(p)), \quad (7)$$

In Eq. (7) the first term is the pixel depth component and is based on the 3D spatial position image $I_{XYZ}$. The second term is the pixel color component and is based on a histogram of colors generated from pixels of $I_f$ with label l and a number of bins hbins. Letting $H_{fi}(b)$ represent the $b^{th}$ histogram bin corresponding to color channel i. The third term is based on pixel position. A distance map $\Delta_l$ is calculated with $\Delta_l(p)$ being the normalized distance of pixel p from the nearest pixel of label l. The fourth term is based on the pre-segmentation image $I_{preS}$.

Each component of the data cost function D(p,$f$) is weighted by a corresponding per-pixel scalar weight $w_d$, $w_c$, $w_p$, $w_s$. Each weight is tunable and/or adaptive in the sense that the weight may be varied to suit the implementation. For example, where a particular 3D sensor generates lower confidence depth data, $w_d$ may be reduced. In some embodiments, the weights are set for a pixel p as:

$$w_x(p) = W_x * (w_x(p) + \theta_x), \quad (8)$$

where x is one of d (depth), c (color), p (position), and s (pre-segmentation). W is the scalar weight, and θ is a scalar offset that is configurable/tunable, for example by a user through the application layer of the software stack. Through manipulation of the offset θ, objects may be segmented at operation 330 more or less on depth, for example to ensure object may be separated from the ground, or not.

The data cost kernel function Φ(·) may be any known to be suitable for a graph-cut, for example absolute difference, or a squared difference, etc. In some exemplary embodiments, the data cost kernel function is:

$$\Phi(x) = 1 - e^{x/\sigma}, \quad (9)$$

where σ is scalar and in some embodiments the standard deviation of all values of x.

The smoothness component of Eq. (6) determines the cost of assigning $f_p$ to p and $f_q$ to q, where p & q are neighboring pixels as defined by N. The smoothness cost represents the costs for two neighboring pixels to have same or different labels. In some embodiments, the neighborhood of pixel p is defined as a four nearest pixel grid (i.e., q is four nearest neighbors of p). In other embodiments, the neighborhood is defined to be 8 nearest pixels. Both of these exemplary neighborhood sizes are suitable for embodiments where the smoothness cost is a function of at least the pixel depth and the pixel color. In some embodiments the smoothness cost is computed as:

$$V(p,q,f_p,f_q) = w_c(p)e^{-\|I_f(p) - I_f(q)\|/\sigma_f} + w_d(p)e^{-\|I_{XYZ}(p) - I_{XYZ}(q)\|/\sigma_{XYZ}}, \quad (10)$$

where $\sigma_f$, $\sigma_{XYZ}$ are scalars and in some embodiments are the standard deviation of all pixel values in the filtered image $I_f$ and 3D spatial image $I_{XYZ}$, respectively. The weights $w_c$, $w_d$ may be calculated similarly to the data cost weights (e.g., following Eq. 8), but with independent/different weight and offset values. The above cost function, including components for both color and depth, intuitively maintains smoothness (a same segment label) over two neighboring pixels that have similar color and/or depth.

Figure 4F:
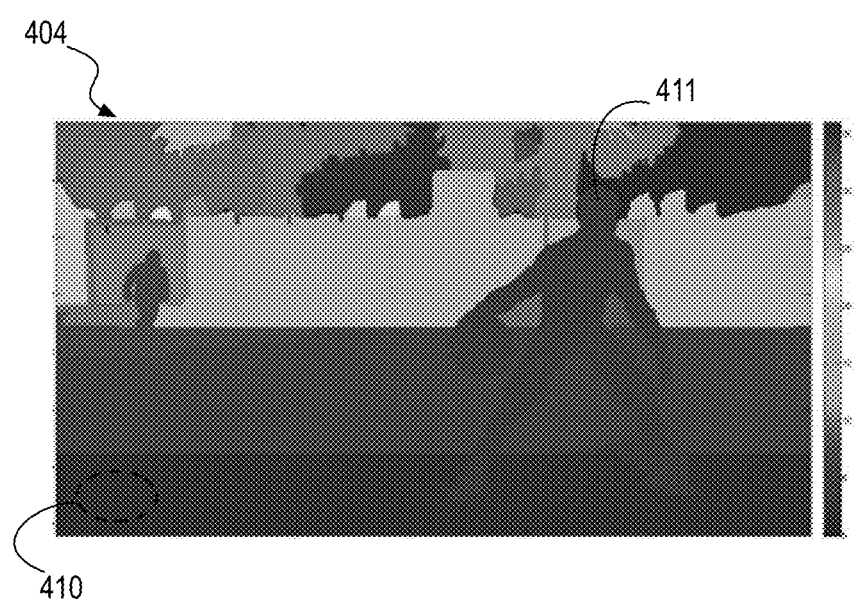
FIG. 4F illustrates multilayered segmentation of the input image depicted in FIG. 4A based on the color and depth information shown in images in FIG. 4C, FIG. 4D and FIG. 4E, in accordance with some embodiments.

Operation 330 then completes with solving the MRF optimization, setup as described above, to obtain the final segmentation or labeling of the input image. Any MRF optimization techniques known may be utilized at operation 330 as embodiments herein are not limited in this respect. FIG. 4F illustrates multilayered segmentation 405 of the filtered input image 403 (FIG. 4C) based on color and depth information, in accordance with some embodiments. FIG. 4F is in grayscale, with each segmented object (e.g., ground region 410 and basketball player 411) at a different gray value. Indications (e.g., integer label IDs) of the final segmentation may then be output as segmentation data at operation 335. The segmentation data may be further stored to an electronic memory in association with the input image received at operation 305.

Figure 5A:
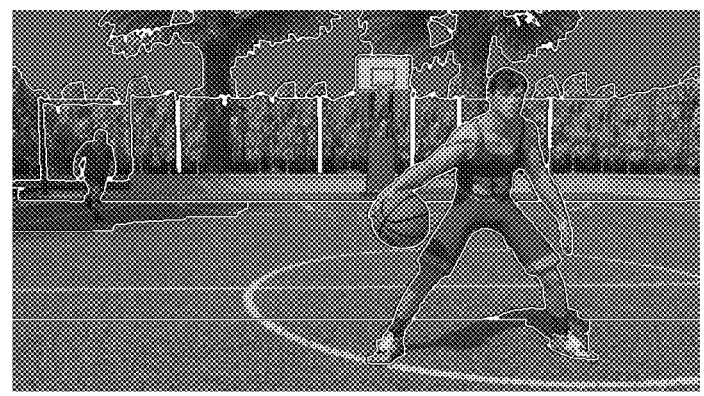
FIGS. 5A, 5B, and 5C illustrate a comparison between multilayered segmentation using both color and depth, only color-based segmentation, and only depth-based segmentation, respectively.
Figure 5B:
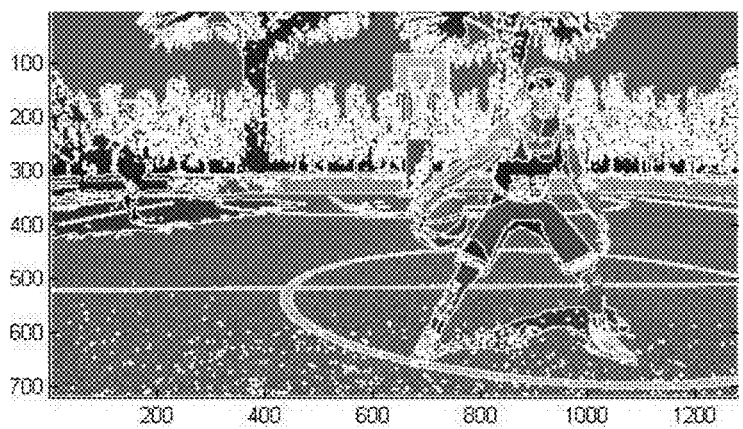
Figure 5C:
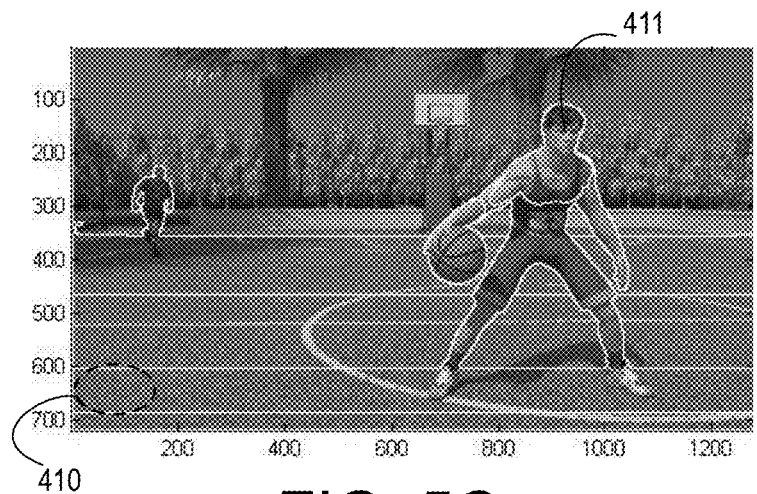

FIGS. 5A, 5B, and 5C illustrate a comparison between multilayered segmentation of input image 401 (FIG. 4A) using both color and depth, only color-based segmentation, and only depth-based segmentation, respectively. In FIG. 5A-5C, borders of segments are denoted in white line. The multilayered segmentation using both color and depth illustrated in FIG. 5A compares favorably to the color-based segmentation illustrated in FIG. 5B, where it is apparent that segmenting based on color only has over-segmented input image 401. The multilayered segmentation using both color and depth illustrated in FIG. 5A also compares favorably to the depth-based segmentation illustrated in FIG. 5C, where it is apparent that segmentation based on depth only has under-segmented input image 401, for example merging some portions of basketball player 411 with nearby ground 410.

Figure 6:
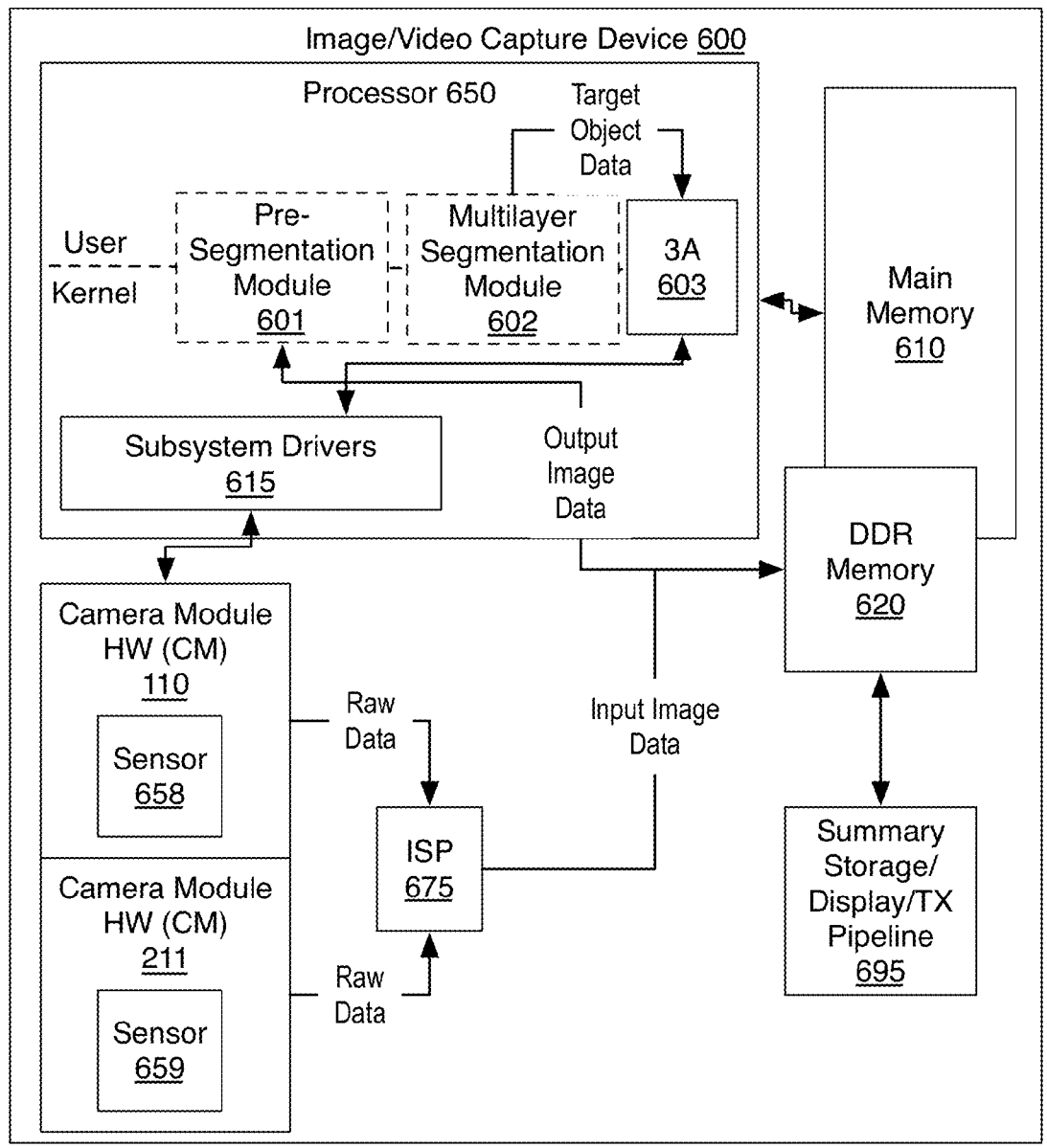
FIG. 6 is a functional block diagram of an image capture device including a multilayer segmentation module, in accordance with embodiments.

FIG. 6 is a functional block diagram of an image capture device 600 including a multilayered segmentation module, in accordance with embodiments. FIG. 6 further illustrates how a multilayered segmentation module may be integrated with various other components of image capture device 600 to provide enhanced video camera output. Image capture device 600 for example may be a portion of a mobile computing device platform. A mobile computing device may refer to any device having a processing system and a mobile power source or supply, such as one or more batteries, for example. Examples of a mobile computing device may include a laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Image capture device 600 includes CM 110 and 211. In the exemplary embodiment, CM 110 further includes a camera sensor 658 and CM 211 includes a camera sensor 659. Sensor 658 may be a HD, FHD, QXGA, WQXGA, QSXGA, or UHD format digital image device, for example. In one embodiment sensor 658 has at least 8-megapixel resolution. Sensor 659 may be a HD, FHD, QXGA, WQXGA, QSXGA, or UHD format digital image device, for example. In one embodiment sensor 659 has a lower pixel resolution than sensor 658, for example 1-5 mega pixel. Although not illustrated in FIG. 6, in further embodiments, image capture device 600 further includes a third CM including a third camera sensor substantially the same as sensor 659 and three images output by the three sensors are utilized by the image capture device 600, for example to provide image depth data for multilayered segmentation.

Camera sensors 658, 659 may provide a color resolution of 8 bits, or more per pixel, is operable to capture continuous video frames progressively. Sensor 658 may have a pixel frequency of 170 MHz, or more. Camera sensors 658, 659 may include an RGB Bayer color filter, an analog amplifier, an A/D converter, other components to convert incident light into a digital signal corresponding to raw image data. Sensors 658, 659 may be controlled to operate a rolling shutter or electronic focal plane shutter process where pixels are read out progressively in a line-sequential fashion for a frame. In exemplary video embodiments, sensors 658, 659 output multiple consecutively exposed frames. CM 110, 211 may output raw data associated with the consecutively exposed frames in conformance with any known streaming protocol, such as a MIPI. Raw image/video data is input to ISP 675. ISP 675 is to receive and analyze frames of raw video data during the horizontal and/or vertical blanking periods associated with CM 110, 211. During raw image data processing, ISP 675 may perform one or more of color space conversion, noise reduction, pixel linearization, and shading compensation, for example.

Pre-processed video data output by ISP 675 may be buffered and queued as input image data ready for image segmentation. In exemplary embodiments, processor 650 implements one or more of the pre-segmentation module 601 and multilayer segmentation module 602. Processor 650 may for example include one or more (programmable) logic circuits to perform one or more stages of the multilayer segmentation method 301 described above. Subsystem drivers 615 within a kernel space of an operating system (OS) instantiated by processor 650 may communicate various image segmentation parameters, such as camera baseline parameters, reference camera designation, etc.

In embodiments, pre-segmentation module 601 includes logic to perform the pre-segmentation operations and algorithms described elsewhere herein. In some embodiments, pre-segmentation module 601 includes logic to perform one or more of the operations of pre-segmentation method 326. In some embodiments, pre-segmentation module logic is implemented with programmable circuitry that has been configured through software instruction(s). In some embodiments, pre-segmentation module 601 includes logic to determine a plurality of pre-segmentation labels for a plurality of pixels of an input image based on a distribution (e.g., mass function or histogram) of three-dimensional (3D) spatial positions (e.g., $I_{XYZ}$).

In embodiments, multilayer segmentation module 602 includes logic to perform the multilayer segmentation operations and algorithms described elsewhere herein. In some embodiments, segmentation module 602 includes logic to perform one or more of the operations of multilayer segmentation method 301. In some embodiments, segmentation module logic is implemented with programmable circuitry that has been configured through software instruction(s). In some embodiments, multilayer segmentation module 601 includes logic to segment the image data based at least on a pixel depth, a pixel color, and a pixel spatial position within the image frame. In some embodiments, multilayer segmentation module 602 includes logic to segment the image data based at least on a pixel depth, a pixel color, and a pixel spatial position within the image frame and the pre-segmentation labels output from pre-segmentation module 601.

Both software and hardware implementations may be well suited to implementing multilayered segmentation method 301. For hardware implementations, pre-segmentation module 601 and/or multilayer segmentation module 602 may be implemented by fixed function logic, for example provided by DSP 675. For software implementations, any known programmable processor, including a core of processor 650, an execution unit of a graphics processor, or other similar vector processor, may be utilized to implement the logic of pre-segmentation module 601 and/or multilayer segmentation module 602. Processor 650 may be solely responsible for generating object segmentation data from input image data received from ISP 675. In one exemplary embodiment, pre-segmentation module 601 and/or multilayer segmentation module 602 are invoked through the user space of a software stack instantiated by processor 650. In some embodiments, processor 650 executes a multilayered segmentation algorithm instantiated in a kernel space of the software stack. In some embodiments, processor 650 is programmed with instructions stored on a computer readable media to cause the processor to perform one or more multilayer segmentation method.

As further illustrated in FIG. 6, image segmentation data may be output to storage/display/transmission pipeline 695. In one exemplary storage pipeline embodiment, image segmentation data is written to electronic memory 620 (e.g., DDR, etc.) to supplement stored input image data. Memory 620 may be separate or a part of a main memory 610 accessible to processor 650. Alternatively, or in addition, storage/display/transmission pipeline 695 is to transmit image segmentation data and/or input image data off image capture device 600.

In one exemplary embodiment illustrated by FIG. 6, processor 650 further includes 3A module 603 that is to implement one or more camera control algorithm (CCA). Exemplary CCA algorithms include automatic white balancing (AWB), automatic focus (AF), and automatic exposure control (AEC), often referred to together as "3A" control. AEC and AF involve the control of CM 110, while AWB involves the control of ISP 675. Exemplary CM control parameters include aperture size, shutter speed, neutral density (ND) filter control, flash power, analog gain (AG), and digital gain (DG). Exemplary ISP control parameters include white balancing gains, lens shading correction (LSC) gains, and noise suppression. In some embodiments, 3A module 603 generates camera control parameters based on image segmentation data output from multilayer segmentation module 602. For example, 3A module 603 may execute at least one of an automatic focus (AF) algorithm, automatic exposure (AE) algorithm, or automatic white balance (AWB) algorithm based on an image segment output from multilayer segmentation module 602.

Figure 7:
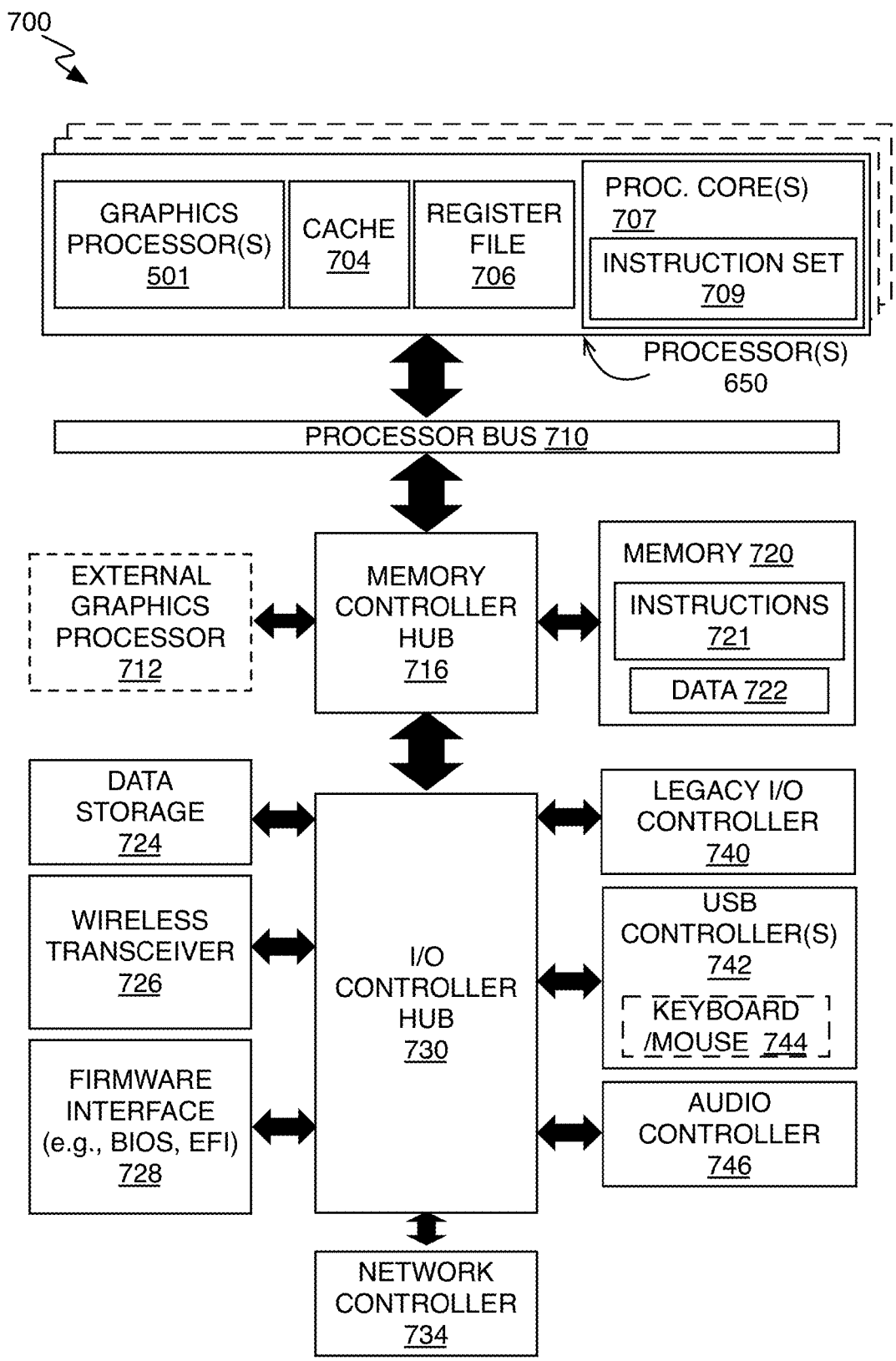
FIG. 7 is a block diagram of a data processing system, in accordance with some embodiments.

FIG. 7 is a block diagram of a data processing system 700 that may be utilized to perform multilayer image segmentation according to some embodiments. Data processing system 700 includes one or more processors 702 and one or more graphics processors 708, and may be a single processor desktop system, a multiprocessor workstation system, or a server system having a large number of processors 702 or processor cores 707. In on embodiment, the data processing system 700 is a system-on-a-chip (SoC) integrated circuit for use in mobile, handheld, or embedded devices.

An embodiment of data processing system 700 can include, or be incorporated within a server-based gaming platform, a game console, including a game and media console, a mobile gaming console, a handheld game console, or an online game console. In some embodiments, data processing system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit data signals between processor 702 and other components in system 700. System 700 has a 'hub' system architecture, including a memory controller hub 716 and an input output (I/O) controller hub 730. Memory controller hub 716 facilitates communication between a memory device and other components of system 700, while I/O Controller Hub (ICH) 730 provides connections to I/O devices via a local I/O bus.

Memory device 720 can be a dynamic random access memory (DRAM) device, a static random access memory (SRAM) device, flash memory device, or some other memory device having suitable performance to serve as process memory. Memory 720 can store data 722 and instructions 721 for use when processor 702 executes a process. Memory controller hub 716 also couples with an optional external graphics processor 712, which may communicate with the one or more graphics processors 708 in processors 702 to perform graphics and media operations.

In some embodiments, ICH 730 enables peripherals to connect to memory 720 and processor 702 via a high-speed I/O bus. The I/O peripherals include an audio controller 746, a firmware interface 728, a wireless transceiver 726 (e.g., Wi-Fi, Bluetooth), a data storage device 724 (e.g., hard disk drive, flash memory, etc.), and a legacy I/O controller for coupling legacy (e.g., Personal System2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710.

Figure 8:
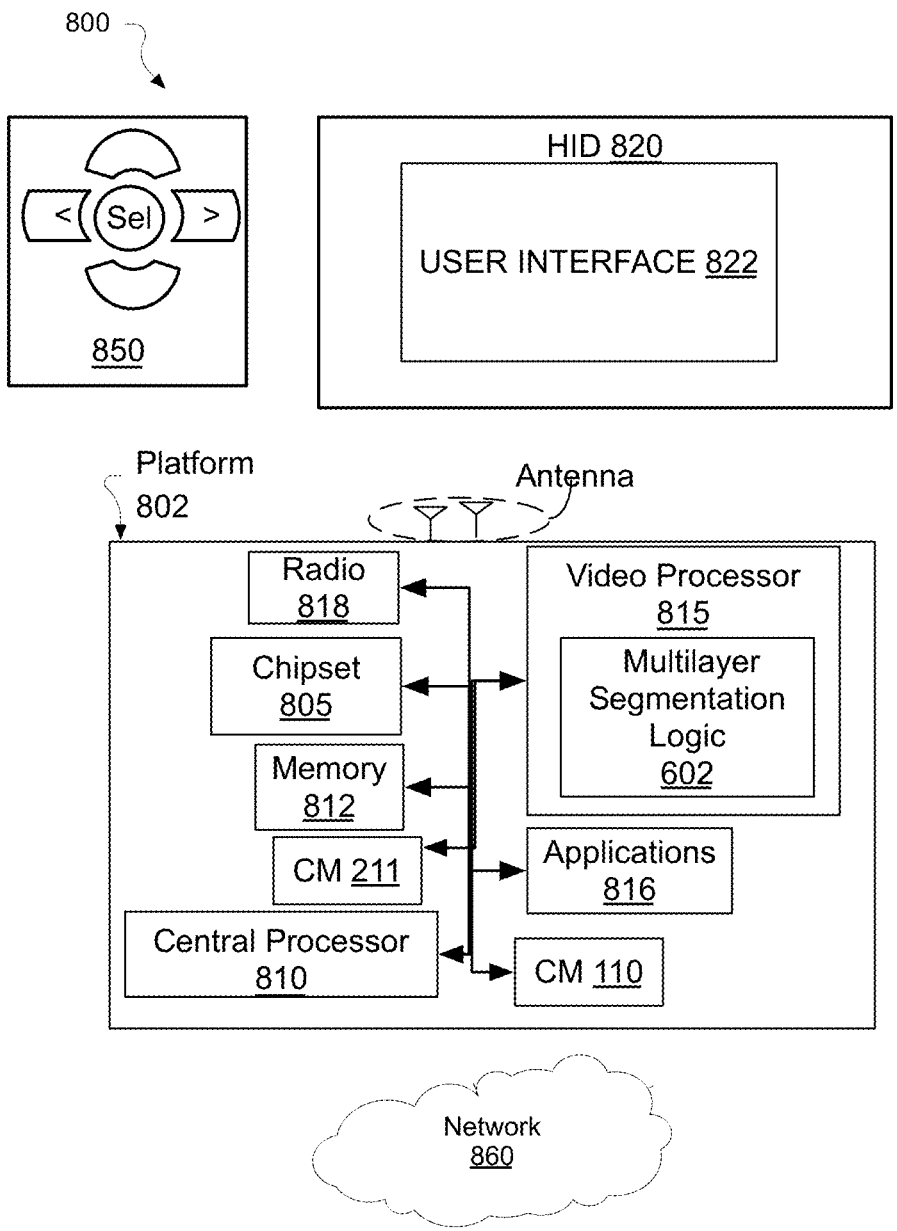
FIG. 8 is a diagram of an exemplary ultra-low power system including an multilayer segmentation module architecture, in accordance with some embodiments.

FIG. 8 is a diagram of an exemplary ultra-low power system 1000 employing a multilayer segmentation module, in accordance with one or more embodiment. System 800 may be a mobile device although system 800 is not limited to this context. System 800 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 800 may also be an infrastructure device. For example, system 800 may be incorporated into a large format television, set-top box, desktop computer, or other home or commercial network device.

System 800 includes a device platform 802 that may implement all or a subset of the various image segmentation methods described above in the context of FIG. 2-FIG. 6. In various exemplary embodiments, video processor 815 executes image segmentation methods, for example as described elsewhere herein. Video processor 815 includes logic circuitry implementing pre-segmentation module 601 and/or multilayer segmentation module 602 to segment an image based on both color and depth, for example as described elsewhere herein. In some embodiments, one or more computer readable media may store instructions, which when executed by CPU 810 and/or video processor 815, cause the processor(s) to execute one or more of the pre-segmentation and segmentation operations described elsewhere herein. One or more image data frames exposed by CM 110 and/or CM 211 may then be stored in memory 812 in associated with segmentation data.

In embodiments, device platform 802 is coupled to a human interface device (HID) 820. Platform 802 may collect raw image data with CM 110 and 211, which is processed and output to HID 820. A navigation controller 850 including one or more navigation features may be used to interact with, for example, device platform 802 and/or HID 820. In embodiments, HID 820 may include any monitor or display coupled to platform 802 via radio 818 and/or network 860. HID 820 may include, for example, a computer display screen, touch screen display, video monitor, television-like device, and/or a television.

In embodiments, device platform 802 may include any combination of CM 110, chipset 805, processors 810, 815, memory/storage 812, applications 816, and/or radio 818. Chipset 805 may provide intercommunication among processors 810, 815, memory 812, video processor 815, applications 816, or radio 818.

One or more of processors 810, 815 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 812 may be implemented as a volatile memory device such as, but not limited to, a Random Access Memory (RAM), Dynamic Random Access Memory (DRAM), or Static RAM (SRAM). Memory 812 may also be implemented as a non-volatile storage device such as, but not limited to flash memory, battery backed-up SDRAM (synchronous DRAM), magnetic memory, phase change memory, and the like.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The thresholded pixel value matching and associated object processes comporting with exemplary embodiments described herein may be implemented in various hardware architectures, cell designs, or "IP cores."

Figure 9:
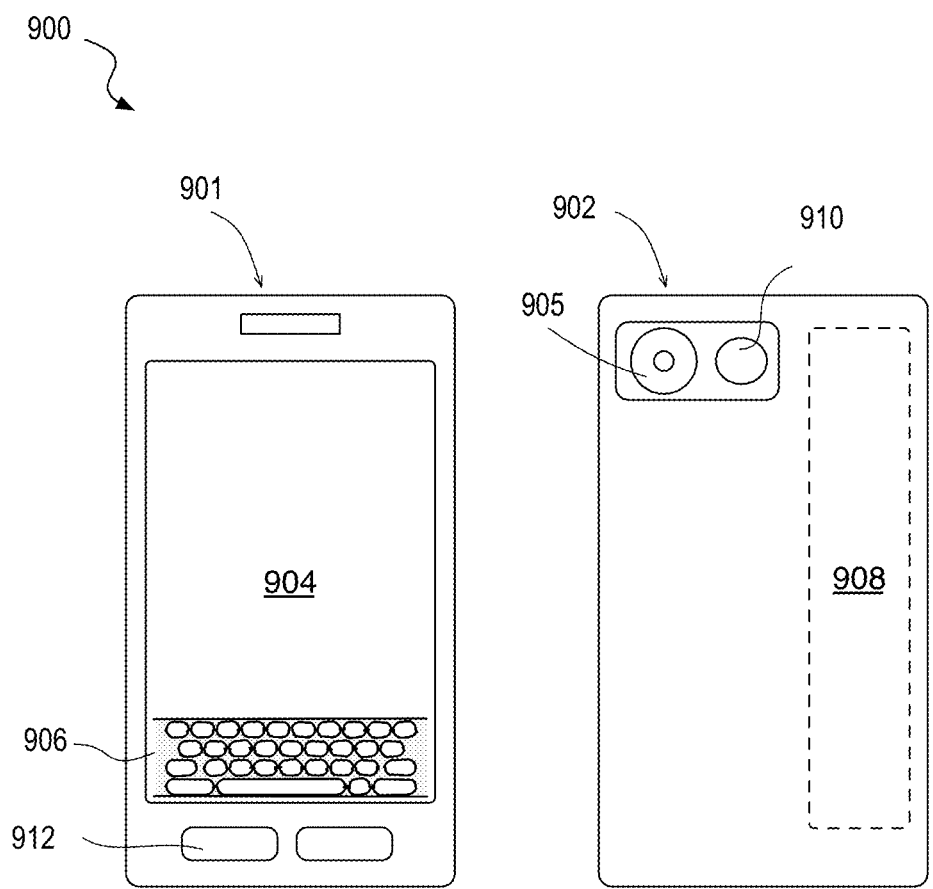
FIG. 9 is a diagram of an exemplary mobile handset platform, arranged in accordance with some embodiments.

As described above, system 800 may be embodied in varying physical styles or form factors. FIG. 9 further illustrates embodiments of a mobile handset device 900 in which platform 930 and/or system 1000 may be embodied. In embodiments, for example, device 900 may be implemented as a mobile computing handset device having wireless capabilities. As shown in FIG. 9, mobile handset device 900 may include a housing with a front 901 and back 902. Device 900 includes a display 904, an input/output (I/O) device 906, and an integrated antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. Embodiments are not limited in this context. Integrated into at least the back 902 is cameras 905 and 910 (e.g., each including a lens, an aperture, and an imaging sensor), both of which may be components of one or more CM through which image data is exposed and output to a multilayer image segmentation module, for example as described elsewhere herein.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood as physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments:

In one or more first embodiments, an apparatus comprises an input to receive image data including at least color information and depth information for each of a plurality of pixels of an image frame, an image segmentation module coupled to the input, the segmentation module including logic to segment the image data based at least on a pixel depth, a pixel color, and a pixel spatial position within the image frame, and an electronic memory to store one or more label indicative of the segmenting in association with the image data.

In furtherance of the first embodiments, the segmentation module further comprises logic to: determine, for each pixel, a scalar weight for each of the pixel depth, pixel color, and pixel position within the image frame, and segment the image data based on a function of the pixel depth, a function of the pixel color, and a function of the pixel spatial position within the image frame, each function weighted by a corresponding one of the scalar weights.

In furtherance of first embodiments immediately above, the segmentation module further comprises logic to determine a data cost as a function of at least the weighted pixel depth, the weighted pixel color, and the weighted pixel spatial position within the image frame, logic to determine a smoothness cost as a function of at least the pixel depth and the pixel color relative to one or more neighboring pixels, logic to perform a graph-cut that optimizes the data cost and smoothness cost.

In furtherance of the first embodiments, the apparatus further comprises a pre-segmentation module including logic to determine a plurality of pre-segmentation labels for the plurality of pixels based on a distribution of three-dimensional (3D) spatial positions. The segmentation module further comprises logic to segment the image data based further on the pre-segmentation labels.

In furtherance of the first embodiments immediately above, the segmentation module further comprises logic to determine, for each pixel, a scalar weight for each of the pixel depth, pixel color, pixel position within the image frame, and the pre-segmentation label, logic to determine a data cost as a function of at least the weighted pixel depth, the weighted pixel color, the weighted pixel spatial position within the image frame, and the weighted pre-segmentation label, logic to determine a smoothness cost as a function of at least the pixel depth and the pixel color relative to one or more neighboring pixels, and logic to perform a graph-cut that optimizes the data cost and smoothness cost.

In furtherance of the first embodiments immediately above, the pre-segmentation module further comprises logic to cluster the 3D spatial position from the plurality of pixels to satisfy a minimum cluster size, logic to cluster the color from the plurality of pixels failing to satisfy the minimum cluster size, and logic to assign one or more pre-segmentation label to each 3D spatial position cluster and each color cluster.

In furtherance of the first embodiments immediately above, the pre-segmentation module further comprises logic to separate the 3D spatial position clusters that satisfy the minimum cluster size into first connected components, logic to assign a pre-segmentation label to one or more pixel in each first connected component to satisfy a minimum connected component size, logic to cluster the color from the plurality of pixels failing to satisfy the minimum connect component size, logic to separate the color clusters into second connected components, and logic to assign a pre-segmentation label to one or more pixel in each first connected component.

In furtherance of the first embodiments immediately above, the pre-segmentation module further comprises logic to cluster the 3D spatial position with logic further to determine from the plurality of pixels a probability of an occurrence within each of a plurality of initial 3D spatial position bins, logic further to generate candidate 3D spatial position bins by splitting or merging the initial 3D spatial position bins based on a depth-sensitive threshold, and logic further to assign to every pixel having a 3D spatial position value spanned by a candidate 3D spatial position bin, a pre-segmentation label unique to each candidate 3D spatial position bin.

In furtherance of the first embodiments, the apparatus further comprises a camera to generate the image data, and a 3A module coupled to the electronic memory to execute at least one of an automatic focus (AF) algorithm, automatic exposure (AE) algorithm, or automatic white balance (AWB) algorithm based on the segmentation label.

In one or more second embodiments, a computer implemented image processing method comprises receiving image data including at least color information and depth information for each of a plurality of pixels of an image frame, segmenting the image frame based at least on a pixel color, a pixel depth, and a pixel spatial position within the image frame, and storing one or more label indicative of the segmenting in association with the image data.

In furtherance of the second embodiments, the method further comprises determining, for each pixel, a scalar weight for each of the pixel depth, pixel color, and pixel position within the image frame, and segmenting the image data based on a function of the pixel depth, a function of the pixel color, and a function of the pixel spatial position within the image frame, each function weighted by a corresponding one of the scalar weights.

In furtherance of the second embodiments immediately above, segmenting the image further comprises determining a data cost as a function of at least the weighted pixel depth, the weighted pixel color, and the weighted pixel spatial position within the image frame, segmenting the image further comprises determining a smoothness cost as a function of at least the pixel depth and the pixel color relative to one or more neighboring pixels, and segmenting the image further comprises performing a graph-cut that optimizes the data cost and smoothness cost.

In furtherance of the second embodiments, the method further comprises determining a plurality of pre-segmentation labels for the plurality of pixels based on a distribution of three-dimensional (3D) spatial positions, and the segmenting is based further on the pre-segmentation labels.

In furtherance of the second embodiments immediately above, the segmenting further comprises determining, for each pixel, a scalar weight for each of the pixel depth, pixel color, pixel position within the image frame, and the pre-segmentation label. The segmenting further comprises determining a data cost as a function of at least the weighted pixel depth, the weighted pixel color, the weighted pixel spatial position within the image frame, and the weighted pre-segmentation label. The segmenting further comprises determining a smoothness cost as a function of at least the pixel depth and the pixel color relative to one or more neighboring pixels, the segmenting further comprises performing a graph-cut that optimizes the data cost and smoothness cost.

In furtherance of the second embodiments determining the plurality of pre-segmentation labels further comprises clustering the 3D spatial position from the plurality of pixels to satisfy a minimum cluster size, clustering the color from the plurality of pixels failing to satisfy the minimum cluster size, and assigning one or more pre-segmentation label to each 3D spatial position cluster and each color cluster.

In furtherance of the second embodiments immediately above, determining the plurality of pre-segmentation labels further comprises separating the 3D spatial position clusters that satisfy the minimum cluster size into first connected components, assigning a pre-segmentation label to one or more pixel in each first connected component to satisfy a minimum connected component size, clustering the color from the plurality of pixels failing to satisfy the minimum connect component size, separating the color clusters into second connected components, and assigning a pre-segmentation label to one or more pixel in each first connected component.

In furtherance of the second embodiments immediately above, determining the plurality of pre-segmentation labels further comprises determining from the plurality of pixels a probability of an occurrence within each of a plurality of initial 3D spatial position bins, generating candidate 3D spatial position bins by splitting or merging the initial 3D spatial position bins based on a depth-sensitive threshold, and assigning to every pixel having a 3D spatial position value spanned by candidate 3D spatial position bin, a pre-segmentation label unique to each candidate 3D spatial position bin.

In one or more third embodiments, an apparatus comprises a means to perform any one of the second embodiments.

In furtherance of the one or more third embodiments, the means further comprises an applications processor including a user space and a kernel space.

In one or more fourth embodiments, one or more computer-readable storage media has instructions stored thereon, which when executed by a processor, cause the processor to perform any one of the second embodiments.

In one or more fifth embodiments, one or more computer-readable storage media has instructions stored thereon, which when executed by a processor, cause the processor to perform a method comprising receiving image data including at least color information and depth information for each of a plurality of pixels of an image frame, segmenting the image frame based at least on a pixel color, a pixel depth, and a pixel spatial position within the image frame, and storing one or more label indicative of the segmenting in association with the image data.

In furtherance of the fifth embodiments, the media further stores instructions thereon, which when executed by a processor, cause the processor to further perform a method comprising determining, for each pixel, a scalar weight for each of the pixel depth, pixel color, and pixel position within the image frame, and segmenting the image data based on a function of the pixel depth, a function of the pixel color, and a function of the pixel spatial position within the image frame, each function weighted by a corresponding one of the scalar weights.

In furtherance of the fifth embodiments immediately above, the media further stores instructions thereon, which when executed by a processor, cause the processor to further perform the segmenting by determining a data cost as a function of at least the weighted pixel depth, the weighted pixel color, and the weighted pixel spatial position within the image frame, by determining a smoothness cost as a function of at least the pixel depth and the pixel color relative to one or more neighboring pixels, and by performing a graph-cut that optimizes the data cost and smoothness cost.

In furtherance of the fifth embodiments, the media further stores instructions thereon, which when executed by a processor, cause the processor to further perform a method comprising determining a plurality of pre-segmentation labels for the plurality of pixels based on a distribution of three-dimensional (3D) spatial positions, and the segmenting is based further on the pre-segmentation labels.

In furtherance of the fifth embodiments, the media further stores instructions thereon, which when executed by a processor, cause the processor to perform the segmentation by further performing a method comprising determining, for each pixel, a scalar weight for each of the pixel depth, pixel color, pixel position within the image frame, and the pre-segmentation label, determining a data cost as a function of at least the weighted pixel depth, the weighted pixel color, the weighted pixel spatial position within the image frame, and the pre-segmentation label, determining a smoothness cost as a function of at least the pixel depth and the pixel color relative to one or more neighboring pixels, and performing a graph-cut that optimizes the data cost and smoothness cost.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. An apparatus, comprising:
   an input to receive image data including at least color information and depth information for each of a plurality of pixels of an image frame;
   a computer processor coupled to the input, the processor to:
   assign pre-segmentation labels to pixels corresponding to three-dimensional (3D) spatial position clusters that satisfy a minimum cluster size;
   assign pre-segmentation labels to pixels corresponding to color clusters determined for those pixels that failed to satisfy the minimum 3D spatial position cluster size;
   determine a data cost associated with assigning a segmentation label to each of the pixels based on each pixel's depth, color, pre-segmentation label, and position relative to the nearest pixel assigned the pre-segmentation label equal to the segmentation label;
   determine a smoothness cost of assigning different labels to neighboring pixels as a function of the pixel depth and the pixel color relative to one or more neighboring pixels;
   select the segmentation label for each pixel based on a graph-cut that optimizes the data cost and smoothness cost; and
   output image segmentation data that maps the selected segmentation labels to the corresponding pixels of the image frame; and an electronic memory coupled to the processor to store the image segmentation data.

2. The apparatus of claim 1, wherein the processor is further to:
determine, for each pixel, a scalar weight for each of the pixel depth, pixel color, pixel pre-segmentation label, and pixel position; and
segment the image data based on functions weighted by a corresponding one of the scalar weights.

3. The apparatus of claim 1, wherein the processor is further to:
separate the 3D spatial position clusters that satisfy the minimum cluster size into first connected components;
assign a pre-segmentation label to one or more pixel in each first connected component to satisfy a minimum connected component size;
separate the color clusters into second connected components; and
assign a pre-segmentation label to one or more pixel in each of the first and second connected components.

4. The apparatus of claim 1, wherein the the processor is further to:
determine from the plurality of pixels a probability of an occurrence within each of a plurality of initial 3D spatial position bins;
generate candidate 3D spatial position bins by splitting or merging the initial 3D spatial position bins based on a depth-sensitive threshold; and
assign to every pixel having a 3D spatial position value spanned by a candidate 3D spatial position bin, a pre-segmentation label unique to each candidate 3D spatial position bin.

5. The apparatus of claim 1 further comprising:
a camera to generate the image data; and
a 3A module coupled to the camera and at least one of the processor and the electronic memory to execute at least one of an automatic focus (AF) algorithm, automatic exposure (AE) algorithm, or automatic white balance (AWB) algorithm based on the image segmentation data.

6. A computer implemented image processing method comprising:
receiving image data including at least color information and depth information for each of a plurality of pixels of an image frame;
assigning pre-segmentation labels to pixels corresponding to three-dimensional (3D) spatial position clusters that satisfy a minimum cluster size;
assigning pre-segmentation labels to pixels corresponding to color clusters determined for those pixels that failed to satisfy the minimum 3D spatial position cluster size;
determining a data cost associated with assigning a segmentation label to each of the pixels based on each pixel's depth, color, pre-segmentation label, and position relative to the nearest pixel assigned the pre-segmentation label equal to the segmentation label;
determining a smoothness cost of assigning different labels to neighboring pixels as a function of the pixel depth and the pixel color relative to one or more neighboring pixels;
select the segmentation label for each pixel based on a graph-cut that optimizes the data cost and smoothness cost; and
output image segmentation data that maps the selected segmentation labels to the corresponding pixels of the image frame to an electronic memory coupled to the processor.

7. The method of claim 6, further comprising:
determining, for each pixel, a scalar weight for each of the pixel depth, pixel color, pixel pre-segmentation label, and pixel position; and
segmenting the image data based on functions weighted by a corresponding one of the scalar weights.

8. The method of claim 6, further comprising:
separating the 3D spatial position clusters that satisfy the minimum cluster size into first connected components;
assigning a pre-segmentation label to one or more pixel in each first connected component to satisfy a minimum connected component size;
separating the color clusters into second connected components; and
assigning a pre-segmentation label to one or more pixel in each of the first and second connected components.

9. The method of claim 6, wherein determining the plurality of pre-segmentation labels further comprises:
determining from the plurality of pixels a probability of an occurrence within each of a plurality of initial 3D spatial position bins;
generating candidate 3D spatial position bins by splitting or merging the initial 3D spatial position bins based on a depth-sensitive threshold; and
assigning to every pixel having a 3D spatial position value spanned by candidate 3D spatial position bin, a pre-segmentation label unique to each candidate 3D spatial position bin.

10. One or more non-transitory computer-readable storage media, with instructions stored thereon, which when executed by a processor, cause the processor to perform a method comprising:
receiving image data including at least color information and depth information for each of a plurality of pixels of an image frame;
assigning pre-segmentation labels to pixels corresponding to three-dimensional (3D) spatial position clusters that satisfy a minimum cluster size;
assigning pre-segmentation labels to pixels corresponding to color clusters determined for those pixels that failed to satisfy the minimum 3D spatial position cluster size;
determining a data cost associated with assigning a segmentation label to each of the pixels based on each pixel's depth, color, pre-segmentation label, and position relative to the nearest pixel assigned the pre-segmentation label equal to the segmentation label;
determining a smoothness cost of assigning different labels to neighboring pixels as a function of the pixel depth and the pixel color relative to one or more neighboring pixels;
select the segmentation label for each pixel based on a graph-cut that optimizes the data cost and smoothness cost; and
output image segmentation data that maps the selected segmentation labels to the corresponding pixels of the image frame to an electronic memory coupled to the processor.

11. The media of claim 10, further storing instructions thereon, which when executed by a processor, cause the processor to further perform a method comprising:
determining, for each pixel, a scalar weight for each of the pixel depth, pixel color, pixel pre-segmentation label, and pixel position; and
segmenting the image data based on functions weighted by a corresponding one of the scalar weights.

12. The apparatus of claim 1, wherein the image segmentation data further comprises integer label IDs indicative of the selected segmentation labels.

13. The apparatus of claim 1, wherein the processor is further to output to a display the image frame with an indication of the segmentation label assigned to each of the pixels.

14. The apparatus of claim 1, wherein the processor is further to output to a display the image frame with edge pixels of each object having the same segmentation label highlighted.

15. The apparatus of claim 1, wherein the processor is further to:
determine from the plurality of pixels a probability of an occurrence within each of a plurality of initial 3D spatial position bins;
generate candidate 3D spatial position bins by splitting or merging the initial 3D spatial position bins based on a depth-sensitive threshold;
assign to every pixel having a 3D spatial position value spanned by a candidate 3D spatial position bin, a pre-segmentation label unique to each candidate 3D spatial position bin;
separate the 3D spatial position clusters that satisfy the minimum cluster size into first connected components;
assign a pre-segmentation label to one or more pixel in each first connected component to satisfy a minimum connected component size;
separate the color clusters into second connected components; and
assign a pre-segmentation label to one or more pixel in each of the first and second connected components.

16. The method of claim 6, wherein the image segmentation data further comprises integer label IDs indicative of the selected segmentation labels.

17. The method of claim 6, wherein the method further includes outputting to a display the image frame with an indication of the segmentation label assigned to each of the pixels.

18. The method of claim 6, wherein the method further includes outputting to a display the image frame with edge pixels of each object having the same segmentation label highlighted.

19. The method of claim 6, further comprising:
determining from the plurality of pixels a probability of an occurrence within each of a plurality of initial 3D spatial position bins;
generating candidate 3D spatial position bins by splitting or merging the initial 3D spatial position bins based on a depth-sensitive threshold;
assigning to every pixel having a 3D spatial position value spanned by a candidate 3D spatial position bin, a pre-segmentation label unique to each candidate 3D spatial position bin;
separating the 3D spatial position clusters that satisfy the minimum cluster size into first connected components;
assigning a pre-segmentation label to one or more pixel in each first connected component to satisfy a minimum connected component size;
separating the color clusters into second connected components; and
assigning a pre-segmentation label to one or more pixel in each of the first and second connected components.

20. The media of claim 10, wherein the image segmentation data further comprises integer label IDs indicative of the selected segmentation labels.

21. The media of claim 10, further storing instructions thereon, which when executed by a processor, cause the processor to further perform a method comprising outputting to a display the image frame with an indication of the segmentation label assigned to each of the pixels.

22. The media of claim 10, further storing instructions thereon, which when executed by a processor, cause the processor to further perform a method comprising outputting to a display the image frame with edge pixels of each object having the same segmentation label highlighted.

23. The media of claim 10, further storing instructions thereon, which when executed by a processor, cause the processor to further perform a method comprising:
determining from the plurality of pixels a probability of an occurrence within each of a plurality of initial 3D spatial position bins;
generating candidate 3D spatial position bins by splitting or merging the initial 3D spatial position bins based on a depth-sensitive threshold;
assigning to every pixel having a 3D spatial position value spanned by a candidate 3D spatial position bin, a pre-segmentation label unique to each candidate 3D spatial position bin;
separating the 3D spatial position clusters that satisfy the minimum cluster size into first connected components;
assigning a pre-segmentation label to one or more pixel in each first connected component to satisfy a minimum connected component size;
separating the color clusters into second connected components; and
assigning a pre-segmentation label to one or more pixel in each of the first and second connected components.

* * * * *